United States Patent
Reichle et al.

[11] Patent Number: 6,066,703
[45] Date of Patent: May 23, 2000

[54] PROCESS FOR THE PRODUCTION OF OLEFIN POLYMERS

[75] Inventors: Walter Thomas Reichle, Warren; Xinmin Yang, Somerset; Frederick John Karol, Belle Mead, all of N.J.

[73] Assignee: Univation Technologies LLC., Houston, Tex.

[21] Appl. No.: 08/977,583

[22] Filed: Nov. 25, 1997

Related U.S. Application Data

[62] Division of application No. 08/782,504, Jan. 10, 1997, Pat. No. 5,747,406.

[51] Int. Cl.[7] .................................................... C08F 4/64
[52] U.S. Cl. .................... 526/127; 526/160; 526/161; 526/901; 526/943; 526/348.5; 502/117; 502/152; 502/155
[58] Field of Search ................................... 526/127, 160, 526/161, 901, 943

[56] References Cited

U.S. PATENT DOCUMENTS

| | | | |
|---|---|---|---|
| 5,387,567 | 2/1995 | Tajima et al. | 502/103 |
| 5,451,555 | 9/1995 | Tajima et al. | 502/103 |
| 5,527,752 | 6/1996 | Reichle et al. | 502/117 |

FOREIGN PATENT DOCUMENTS

| | | |
|---|---|---|
| 546690A1 | 6/1993 | European Pat. Off. . |
| 587440A2 | 3/1994 | European Pat. Off. . |
| 694563A1 | 1/1996 | European Pat. Off. . |

*Primary Examiner*—David W. Wu
*Attorney, Agent, or Firm*—Paul W. Leuzzi; Sharon H. Hegedus; Jaimes Sher

[57] ABSTRACT

A process for the polymerization of an olefin which employs as the catalyst composition the reaction product of a) a monocycloalkadienyl catalyst precursor; b) an activity enhancing cycloalkadiene; and c) an activating cocatalyst is disclosed.

8 Claims, No Drawings

PROCESS FOR THE PRODUCTION OF OLEFIN POLYMERS

This application is a Division of prior U.S. application Ser. No. 08/782,504 Filing Date, Jan. 10, 1997, now U.S. Pat. No. 5,747,406.

An improved catalyst composition and its use in the production of olefin polymers are provided. The catalyst composition comprises the reaction product of a) a monocycloalkadienyl catalyst precursor, b) an activity enhancing cycloalkadiene; and c) an activating cocatalyst. The catalyst composition demonstrates enhanced activity in the polymerization of olefins.

BACKGROUND OF THE INVENTION

A variety of single site catalyst compositions have been developed to prepare olefin polymers. Single site catalysts have been shown to be highly useful in the preparation of polyolefins, producing relatively homogeneous copolymers at good polymerization rates, allowing one to tailor closely the final properties of the polymer produced. In contrast to traditional Ziegler-Natta catalyst compositions, single site catalyst compositions comprise catalytic compounds in which each catalyst composition molecule contains one or only a few polymerization sites. Metallocenes are the most well known type of single site catalyst precursor, and are organometallic coordination complexes containing one or more pi-bonded moieties (i.e., cycloalkadienyl groups) in association with a metal atom from Groups IIIB to VIII or the Lanthanide series of the Periodic Table of Elements.

Monocycloalkadienyl catalyst precursors are useful single site catalysts precursors. However, they sometimes demonstrate low activities in polymerizing olefins. To this end, applicants have discovered that when monocycloalkadienyl catalyst precursors are combined with an activity enhancing cycloalkadiene and an activating cocatalyst, a catalyst composition results having increased activity for the polymerization of olefins relative to that of a catalyst composition containing only the monocycloalkadienyl catalyst precursor and activating cocatalyst. In addition, in certain instances, the properties of the olefin polymer produced, such as its short chain branching frequency, are also improved over that of an olefin polymer produced by a catalyst composition containing only the monocycloalkadienyl catalyst precursor and activating cocatalyst.

U.S. Pat. Nos. 5,387,567 and 5,451,555, and European Patent Application Publication Nos. 0 546 690 A1, 0 587 440 A1, and 0 694 563 A1, all assigned to Nippon Oil Company, Ltd., relate to catalyst compositions comprising transition metal compounds of the formula $Me(OR)_p R_q X_{4-p-q}$ and $MeR_n X_{4-n}$ wherein Me is a transition metal, each R is a hydrocarbon group of 1–24 carbons, X is a halogen, and p, q, and n are each 0 to 4, and organocyclic compounds having two or more conjugated double bonds. Such catalyst compositions may also include Group I-III metal compounds as well. However, the Nippon Oil publications do not teach or suggest catalyst compositions that are the reaction product of a) a monocycloalkadienyl catalyst precursor, b) an activity enhancing cycloalkadiene; and c) an activating cocatalyst, or the increased activity of such catalyst compositions.

SUMMARY OF THE INVENTION

The invention provides a catalyst composition comprising the reaction product of:

a) monocycloalkadienyl catalyst precursor having the formula:

$$LMX_x \quad (I)$$

wherein:

M is a metal from groups IIIB to VIII or a rare earth metal of the Periodic Table;

L is a cycloalkadienyl ligand;

each X is independently hydrogen, an aryl, alkyl, alkenyl, alkylaryl, or arylalkyl radical having 1–20 carbon atoms, a hydrocarboxy radical having 1–20 carbon atoms, a halide, a nitrogen containing radical having 1–20 carbon atoms, or $Q_2YZ$, wherein each Q is independently selected from the group consisting of —O—, —NR—, —CR$_2$— and —S—; Y is either C or S; and Z is selected from the group consisting of —OR, —NR$_2$, —CR$_3$, —SR, —SiR$_3$, —PR$_2$, —H, and substituted or unsubstituted aryl groups, with the proviso that when Q is —NR— then Z is selected from the group consisting of —OR, —NR$_2$, —SR, —SiR$_3$, —PR$_2$ and —H; and x is 2, 3, or 4 depending upon the valence state of M;

b) an activity enhancing cycloalkadiene; and c) an activating cocatalyst.

The invention also provides a process for the polymerization of an olefin, which comprises contacting at least one olefin monomer under polymerization conditions with the above catalyst composition.

DETAILED DESCRIPTION OF THE INVENTION

Olefin polymers that may be produced according to the invention include, but are not limited to, ethylene homopolymers, homopolymers of linear or branched higher alpha-olefins containing 3 to about 20 carbon atoms, and interpolymers of ethylene and such higher alpha-olefins, with densities ranging from about 0.86 to about 0.96. Suitable higher alpha-olefins include, for example, propylene, 1-butene, 1-pentene, 1-hexene, 4-methyl-1-pentene, 1-octene, and 3,5,5-trimethyl-1-hexene. Olefin polymers according to the invention may also be based on or contain conjugated or non-conjugated dienes, such as linear, branched, or cyclic hydrocarbon dienes having from about 4 to about 20, preferably 4 to 12, carbon atoms. Preferred dienes include 1,4-pentadiene, 1,5-hexadiene, 5-vinyl-2-norbornene, 1,7-octadiene, vinyl cyclohexene, dicyclopentadiene, butadiene, isobutylene, isoprene, ethylidene norbornene, norbornadiene and the like. Aromatic compounds having vinyl unsaturation such as styrene and substituted styrenes, and polar vinyl monomers such as acrylonitrile, maleic acid esters, vinyl acetate, acrylate esters, methacrylate esters, vinyl trialkyl silanes and the like may be polymerized according to the invention as well. Specific olefin polymers that may be made according to the invention include, for example, polyethylene, polypropylene, ethylene/propylene rubbers (EPR's), ethylene/propylene/diene terpolymers (EPDM's), polybutadiene, polyisoprene and the like.

The catalyst composition comprises the reaction product of: a) a monocycloalkadienyl catalyst precursor, b) an activity enhancing cycloalkadiene; and c) an activating cocatalyst. The monocycloalkadienyl catalyst precursor has the formula:

$$LMX_x \quad (I)$$

wherein:

M is a metal from groups IIIB to VIII or a rare earth metal of the Periodic Table;

L is cycloalkadienyl ligand, such as cyclopentadienyl, indenyl, or fluorenyl, optionally substituted with one or more hydrocarbyl groups containing 1 to 20 carbon atoms;

each X is independently hydrogen, an aryl, alkyl, alkenyl, alkylaryl, or arylalkyl radical having 1–20 carbon atoms, a hydrocarboxy radical having 1–20 carbon atoms, a halide, a nitrogen containing radical having 1–20 carbon atoms, or $Q_2YZ$, wherein each Q is independently selected from the group consisting of —O—, —NR—, —$CR_2$— and —S—, preferably oxygen; Y is either C or S, preferably carbon; and Z is selected from the group consisting of —OR, —$NR_2$, —$CR_3$, —SR, —$SiR_3$—, —$PR_2$, —H, and substituted or unsubstituted aryl groups, with the proviso that when Q is —NR— then Z is selected from the group consisting of —OR, —$NR_2$, —SR, —$SiR_3$, —$PR_2$ and —H, preferably Z is selected from the group consisting of —OR, —$CR_3$ and —$NR_2$; and x is 2, 3, or 4 depending upon the valence state of M.

Illustrative but non-limiting examples of catalyst precursors represented by formula I are cyclopentadienyl titanium trichloride, methylcyclopentadienyl titanium trichloride, methylcyclopentadienyl titanium tribromide, pentamethylcyclopentadienyl titanium trichloride, indenyl titanium trichloride, cyclopentadienyl titanium trimethyl, cyclopentadienyl titanium triphenyl, cyclopentadienyl titanium tris (methoxide), pentamethylcyclopentadienyl titanium tris (methoxide), cyclopentadienyl titanium tris (dimethylamide), cyclopentadienyl titanium tris (diethylamide), cyclopentadienyl zirconium trichloride , methylcylopentadienyl zirconium trichloride, pentamethylcyclopentadienyl zirconium trichloride, indenyl zirconium trichloride, cyclopentadienyl zirconium tris(methoxide), methylcyclopentadienyl zirconium tris(methoxide), pentamethylcyclopentadienyl zirconium tris(methoxide), indenyl zirconium tris(methoxide), cyclopentadienyl zirconium trimethyl, cyclopentadienyl zirconium trineopentyl, cyclopentadienyl zirconium trimethyl, cyclopentadienyl zirconium tris(dimethylamide), methylcyclopentadienyl zirconium tris (diethylamide), indenyl zirconium tris (diethylamide); cyclopentadienyl hafnium trichloride, methylcyclopentadienyl hafnium trichloride, pentamethylcyclopentadienyl hafnium trichloride, cyclopentadienyl hafnium triphenyl, cyclopentadienyl hafnium tri(neopentyl), cyclopentadienyl hafnium trimethyl, cyclopentadienyl hafnium tris(methoxide), cyclopentadienyl hafnium tris (diethylamide), and pentamethylcyclopentadienyl hafnium tris(diethylamide).

A preferred type of monocycloalkadienyl catalyst precursor for use in the invention is a complex of a transition metal, a substituted or unsubstituted pi-bonded ligand, and one or more heteroallyl moieties, such as those described in U.S. Pat. No. 5,527,752. Preferably, such complexes have one of the following formulas:

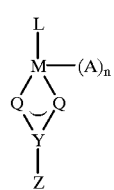

(II)

wherein:

M is a transition metal, preferably Zr or Hf;

L is a substituted or unsubstituted, pi-bonded ligand coordinated to M, preferably a cycloalkadienyl ligand;

each Q is independently selected from the group consisting of —O—, —NR—, —$CR_2$— and —S—, preferably oxygen;

Y is either C or S, preferably carbon;

Z is selected from the group consisting of —OR, —$NR_2$, —$CR_3$, —SR, —$SiR_3$, —$PR_2$, —H, and substituted or unsubstituted aryl groups, with the proviso that when Q is —NR— then Z is selected from the group consisting of —OR, —$NR_2$, —SR, —$SiR_3$, —$PR_2$ and —H, preferably Z is selected from the group consisting of —OR, —$CR_3$ and —$NR_2$;

n is 1 or 2;

A is a univalent anionic group when n is 2 or A is a divalent anionic group when n is 1, preferably A is a carbamate, carboxylate, or other heteroallyl moiety described by the Q, Y and Z combination; and each R is independently a group containing carbon, silicon, nitrogen, oxygen, and/or phosphorus where one or more R groups may be attached to the L substituent, preferably R is a hydrocarbon group containing from 1 to 20 carbon atoms, most preferably an alkyl, cycloalkyl, or an aryl group and one or more may be attached to the L substituent; or

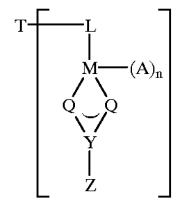

(III)

wherein:

M is a transition metal, preferably Zr or Hf;

L is a substituted or unsubstituted, pi-bonded ligand coordinated to M, preferably a cycloalkadienyl ligand;

each Q is independently selected from the group consisting of —O—, —NR—, —$CR_2$ — and —S—, preferably oxygen;

Y is either C or S, preferably carbon;

Z is selected from the group consisting of —OR, —$NR_2$, —$CR_3$, —SR, —$SiR_3$, —$PR_2$, —H, and substituted or unsubstituted aryl groups, with the proviso that when Q is —NR— then Z is selected from the group consisting of —OR, —$NR_2$, —SR, —$SiR_3$, —$PR_2$ and —H, preferably Z is selected from the group consisting of —OR, —$CR_3$ and —$NR_2$;

n is 1 or 2;

A is a univalent anionic group when n is 2 or A is a divalent anionic group when n is 1, preferably A is a carbamate, carboxylate, or other heteroallyl moiety described by the Q, Y and Z combination;

each R is independently a group containing carbon, silicon, nitrogen, oxygen, and/or phosphorus where one or more R groups may be attached to the L substituent, preferably R is a hydrocarbon group containing from 1 to 20 carbon atoms, most preferably an alkyl, cycloalkyl, or an aryl group and one or more may be attached to the L substituent;

T is a bridging group selected from the group consisting of alkylene and arylene groups containing from 1 to 10 carbon atoms optionally substituted with carbon or heteroatoms, germanium, silicone and alkyl phosphine; and m is 2 to 7, preferably 2 to 6, most preferably 2 or 3.

In formulas I, II, and III, the substituent formed by Q, Y and Z is a unicharged polydentate ligand exerting electronic effects due to its high polarizability, similar to the cyclopentadienyl group. In the most preferred embodiments of this invention, the disubstituted carbamates,

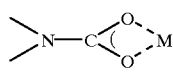

and the carboxylates

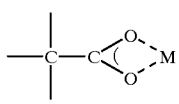

are employed.

Examples of complexes according to formulas II and III include indenyl zirconium tris(diethylcarbamate), indenyl zirconium tris(trimethylacetate), indenyl zirconium tris(p-toluate), indenyl zirconium tris(benzoate), (1-methylindenyl)zirconium tris(pivalate), (2-methylindenyl) zirconium tris(diethylcarbamate), (methylcyclopentadienyl) zirconium tris(trimethylacetate), cyclopentadienyl tris(pivalate), and (pentamethylcyclopentadienyl) zirconium tris(benzoate). Preferred examples are indenyl zirconium tris (diethylcarbamate), indenyl zirconium tris (trimethylacetate), and (methylcyclopentadienyl) zirconium tris(trimethylacetate).

The catalyst precursor may be made by any means, and the invention is not limited thereby. For example, a method of manufacturing a preferred catalyst precursor, indenyl zirconium tris(diethylcarbamate), is first to react a source of cycloalkadienyl ligand with a metal compound of the formula $M(NR_2)_4$, in which M and R are defined above, to introduce the cycloalkadienyl ligand onto the metal compound. The resulting product is then dissolved in an inert solvent, such as toluene, and the heterocumulene $CO_2$ is contacted with the dissolved product to insert into one or more $M-NR_2$ bonds to form a carbamate.

The activity enhancing cycloalkadiene is an organocyclic compound having two or more conjugated double bonds, examples of which include cyclic hydrocarbon compounds having two or more, preferably 2–4, more preferably 2–3, conjugated double bonds and 4–24, preferably 4–12, carbons, optionally substituted with a substituting group such as alkyl or aralkyl of 1–12 carbon atoms.

Examples of activity enhancing cycloalkadienes include unsubstituted and substituted cyclopentadienes, indenes, fluorenes, and fulvenes, such as cyclopentadiene, methylcyclopentadiene, ethylcyclopentadiene, t-butylcyclopentadiene, hexylcyclopentadiene, octylcyclopentadiene, 1,2-dimethylcyclopentadiene, 1,3-dimethylcyclopentadiene, 1,2,4-trimethylcyclopentadiene, 1,2,3,4-tetramethylcyclopentadiene, pentamethylcyclopentadiene, indene, 4-methyl-1-indene, 4,7-dimethylindene, 4,5,6,7-tetrahydroindene, fluorene, methylfluorene, cycloheptatriene, methylcycloheptatriene, cyclooctatraene, methylcyclooctatraene, fulvene and dimethylfulvene. These compounds may be bonded through an alkylene group of 2–8, preferably 2–3, carbon atoms, such as for example bis-indenylethane, bis(4,5,6,7-tetrahydro-1-indenyl)ethane, 1,3-propanedinyl-bis(4,5,6,7-tetrahydro) indene, propylene-bis(1-indene), isopropyl(1-indenyl) cyclopentadiene, diphenylmethylene(9-fluorenyl), cyclopentadiene and isopropylcyclopentadienyl-1-fluorene. Preferably, the activity enhancing cycloalkadiene is selected from the group consisting of cyclopentadiene, methylcyclopentadiene, indene, and methyl-n-propylcyclopentadiene.

The amount of activity enhancing cycloalkadiene used is about 0.01 to about 10 moles per mole of catalyst precursor. Preferably, about 0.1 to about 2.0 moles of cycloalkadiene per mole of catalyst precursor are used. More preferably, about 0.2 to about 1.0 moles of cycloalkadiene per mole of catalyst precursor are used.

In one embodiment of the invention, the amount of cycloalkadiene used is about 0.1 to about 2.0 moles per mole of catalyst precursor, preferably about 0.1 to about 1.1 moles per mole of catalyst precursor. Under these conditions, a 0.920 density ethylene polymer may be made having one or more of the following properties: a high number average molecular weight, i.e., in the range of about 5000 to about 200,000, preferably about 20,000 to about 100,000, a narrow molecular weight distribution (PDI), i.e., about 3 to 5, or a high short chain branch frequency, i.e., at least about 10 short chain branches per 1000 main chain carbons, preferably at least about 15 short chain branches per main chain carbons, as measured by carbon-13 MNR.

The activating cocatalyst is capable of activating the catalyst precursor. Preferably, the activating cocatalyst is one of the following: (a) branched or cyclic oligomeric poly(hydrocarbylaluminum oxide)s which contain repeating units of the general formula $-(Al(R^*)O)-$, where $R^*$ is hydrogen, an alkyl radical containing from 1 to about 12 carbon atoms, or an aryl radical such as a substituted or unsubstituted phenyl or naphthyl group; (b) ionic salts of the general formula $[A^+][BR^{}_4{}^-]$, where $A^+$ is a cationic Lewis or Bronsted acid capable of abstracting an alkyl, halogen, or hydrogen from the metallocene catalysts, B is boron, and $R^{}$ is a substituted aromatic hydrocarbon, preferably a perfluorophenyl radical; (c) boron alkyls of the general formula $BR^{}_3$, where $R^{}$ is as defined above; or mixtures thereof.

Preferably, the activating cocatalyst is a branched or cyclic oligomeric poly(hydrocarbylaluminum oxide) or a boron alkyl. More preferably, the activating cocatalyst is an aluminoxane such as methylaluminoxane (MAO) or modified methylaluminoxane (MMAO), or a boron alkyl.

Aluminoxanes are well known in the art and comprise oligomeric linear alkyl aluminoxanes represented by the formula:

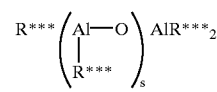

and oligomeric cyclic alkyl aluminoxanes of the formula:

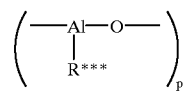

wherein s is 1–40, preferably 10–20; p is 3–40, preferably 3–20; and $R^{***}$ is an alkyl group containing 1 to 12 carbon atoms, preferably methyl.

Aluminoxanes may be prepared in a variety of ways. Generally, a mixture of linear and cyclic aluminoxanes is obtained in the preparation of aluminoxanes from, for example, trimethylaluminum and water. For example, an aluminum alkyl may be treated with water in the form of a moist solvent. Alternatively, an aluminum alkyl, such as trimethylaluminum, may be contacted with a hydrated salt, such as hydrated ferrous sulfate. The latter method comprises treating a dilute solution of trimethylaluminum in, for example, toluene with a suspension of ferrous sulfate heptahydrate. It is also possible to form methylaluminoxanes by the reaction of a tetraalkyldialuminoxane containing $C_2$ or higher alkyl groups with an amount of trimethylaluminum that is less than a stoichiometric excess. The synthesis of methylaluminoxanes may also be achieved by the reaction of a trialkyl aluminum compound or a tetraalkyldialuminoxane containing $C_2$ or higher alkyl groups with water to form a polyalkyl aluminoxane, which is then reacted with trimethylaluminum. Further modified methylaluminoxanes, which contain both methyl groups and higher alkyl groups, i.e., isobutyl groups, may be synthesized by the reaction of a polyalkyl aluminoxane containing $C_2$ or higher alkyl groups with trimethylaluminum and then with water as disclosed in, for example, U.S. Pat. No. 5,041,584.

When the activating cocatalyst is a branched or cyclic oligomeric poly(hydrocarbylaluminum oxide), the mole ratio of aluminum atoms contained in the poly (hydrocarbylaluminum oxide) to total metal atoms contained in the catalyst precursor is generally in the range of from about 2:1 to about 100,000:1, preferably in the range of from about 10:1 to about 10,000:1, and most preferably in the range of from about 50:1 to about 2,000:1. When the activating cocatalyst is an ionic salt of the formula $[A^+]$ $[BR^{}_4^-]$ or a boron alkyl of the formula $BR^{}_3$, the mole ratio of boron atoms contained in the ionic salt or the boron alkyl to total metal atoms contained in the catalyst precursor is generally in the range of from about 0.5:1 to about 10:1, preferably in the range of from about 1:1 to about 5:1.

The catalyst composition may be impregnated onto a solid, inert support, in liquid form such as a solution or dispersion, spray dried, in the form of a prepolymer, or formed in-situ during polymerization. Particularly preferred among these is a catalyst composition that is spray dried as described in European Patent Application No. 0 668 295 A1 or in liquid form as described in U.S. Pat. No. 5,317,036.

In the case of a supported catalyst composition, the catalyst composition may be impregnated in or deposited on the surface of an inert substrate such as silica, carbon black, polyethylene, polycarbonate porous crosslinked polystyrene, porous crosslinked polypropylene, alumina, thoria, zirconia, or magnesium halide (e.g., magnesium dichloride), such that the catalyst composition is between 0.1 and 90 percent by weight of the total weight of the catalyst composition and the support.

The catalyst composition may be used for the polymerization of olefins by any suspension, solution, slurry, or gas phase process, using known equipment and reaction conditions, and is not limited to any specific type of reaction system. Generally, olefin polymerization temperatures range from about 0° C. to about 200° C. at atmospheric, subatmospheric, or superatmospheric pressures. Slurry or solution polymerization processes may utilize subatmospheric or superatmospheric pressures and temperatures in the range of about 40° C. to about 110° C. A useful liquid phase polymerization reaction system is described in U.S. Pat. No. 3,324,095. Liquid phase reaction systems generally comprise a reactor vessel to which olefin monomer and catalyst composition are added, and which contains a liquid reaction medium for dissolving or suspending the polyolefin. The liquid reaction medium may consist of the bulk liquid monomer or an inert liquid hydrocarbon that is nonreactive under the polymerization conditions employed. Although such an inert liquid hydrocarbon need not function as a solvent for the catalyst composition or the polymer obtained by the process, it usually serves as solvent for the monomers employed in the polymerization. Among the inert liquid hydrocarbons suitable for this purpose are isopentane, hexane, cyclohexane, heptane, benzene, toluene, and the like. Reactive contact between the olefin monomer and the catalyst composition should be maintained by constant stirring or agitation. The reaction medium containing the olefin polymer product and unreacted olefin monomer is withdrawn from the reactor continuously. The olefin polymer product is separated, and the unreacted olefin monomer and liquid reaction medium are recycled into the reactor.

Preferably, gas phase polymerization is employed, with superatmospheric pressures in the range of 1 to 1000 psi, preferably 50 to 400 psi, most preferably 100 to 300 psi, and temperatures in the range of 30 to 130° C., preferably 65 to 110° C. Stirred or fluidized bed gas phase reaction systems are particularly useful. Generally, a conventional gas phase, fluidized bed process is conducted by passing a stream containing one or more olefin monomers continuously through a fluidized bed reactor under reaction conditions and in the presence of catalyst composition at a velocity sufficient to maintain a bed of solid particles in a suspended condition. A stream containing unreacted monomer is withdrawn from the reactor continuously, compressed, cooled, optionally fully or partially condensed as disclosed in U.S. Pat. Nos. 4,528,790 and 5,462,999, and recycled to the reactor. Product is withdrawn from the reactor and make-up monomer is added to the recycle stream. As desired for temperature control of the system, any gas inert to the catalyst composition and reactants may also be present in the gas stream. In addition, a fluidization aid such as carbon black, silica, clay, or talc may be used, as disclosed in U.S. Pat. No. 4,994,534.

Polymerization may be carried out in a single reactor or in two or more reactors in series, and is conducted substantially in the absence of catalyst poisons. Organometallic compounds may be employed as scavenging agents for poisons to increase the catalyst activity. Examples of scavenging agents are metal alkyls, preferably aluminum alkyls, most preferably triisobutylaluminum.

Conventional adjuvants may be included in the process, provided they do not interfere with the operation of the catalyst composition in forming the desired polyolefin. Hydrogen or a metal or non-metal hydride, e.g., a silyl hydride, may be used as a chain transfer agent in the process. Hydrogen may be used in amounts up to about 10 moles of hydrogen per mole of total monomer feed.

The following examples further illustrate the invention.

EXAMPLES

Glossary

Activity is measured in g polyethylene/mmol metal·hr·100 psi ethylene.

MAO is a solution of methylaluminoxane in toluene, approximately 2.0 molar in aluminum, commercially available from Akzo Chemicals, Inc.

MMAO is a solution of modified methylaluminoxane in hexane, approximately 2.25 molar in aluminum, commercially available from Akzo Chemicals, Inc. (type M).

Density in g/cc is determined in accordance with ASTM 1505, based on ASTM D-1928, procedure C, plaque preparation. A plaque is made and conditioned for one hour at 100° C. to approach equilibrium crystallinity, measurement for density is then made in a density gradient column.

TIBA is triisobutylaluminum.

MI is melt index, reported as grams per 10 minutes, determined in accordance with ASTM D-1238, condition E, at 190° C.

FI is flow index, reported as grams per 10 minutes, is determined in accordance with ASTM D-1238, condition F, and is measured at ten times the weight used in the melt index text.

MFR is melt flow ratio, which is the ratio of flow index to melt index. It is related to the molecular weight distribution of the polymer.

BBF

BBF is butyl branch frequency as determined using carbon-13 NMR. An 8% weight/volume concentration was prepared by dissolving an ethylene copolymer in ortho dichlorobenzene (ODCB) in an NMR tube. A closed capillary tube of deuterium oxide was inserted into the NMR tube as a field frequency lock. Data was collected on the Bruker AC 300 at 115° C. using NOE enhanced conditions with a 30° PW and a 5 second repetition time. The number of carbon scans usually varied from 1,000 to 10,000 with the more highly branched samples requiring shorter acquisitions. The area of the peaks was measured along with the area of the total aliphatic region. The areas of carbons contributed by the comonomer were averaged and ratioed to the area of the backbone to give the mole fraction. This number was then converted into branch frequency.

Determination of Zr in Polyethylene

Polyethylene samples were weighed into platinum crucibles, ignited, then placed in a muffle furnace (580° C.) until all the carbon had burned off. After cooling, hydrochloric acid was added to the residue and it was heated gently to aid dissolution. The crucibles were cooled, and hydrofluoric acid was added to insure total dissolution of the silicane. The samples were then quantitatively transferred and diluted to 15 ml with deionized water and analyzed using an Inductively-Coupled Plasma (Atom Scan 25, Thermo Jarrell Ash).

Catalyst Precursor Preparations: $\eta^5$-MeCpZr[$O_2CC(CH)_3$]$_3$

First, $\eta^5$-IndZr(NEt$_2$)$_3$ was prepared by reacting indene (in excess) with Zr(NEt$_2$)$_4$ either neat or in toluene solution at 100–115° for 1–4 hours. The resulting Et$_2$NH, along with the toluene, was pumped off and the excess indene removed under high vacuum (110°/0.05 mmHg/0.5 hr). This yielded an approx. 95 mole % pure $\eta^5$-IndZr(NEt$_2$)$_3$ residue product. All analyses were by $^1$H-NMR using d$_8$-toluene as solvent and NMR lock.

Next, an approx. 2 wt. % solution of the $\eta^5$-IndZr(NEt$_2$)$_3$ residue product in toluene (dried over CaH$_2$) was placed in a small Hoke cylinder (25–100 ml). The solution in the Hoke cylinder (under N$_2$) was cooled to approx. 0° C. in an ice bath. Carbon dioxide (HPLC grade) was added thereto, first at low pressure (1–5 psi) with good agitation, and then at increased pressure (60 psi) for 0.5 hr. Thus, a dilute toluene solution of $\eta^5$-indenyl zirconium tris(diethylcarbamate) was obtained, which contained 3–7 mole % of free indene. This was stored at r.t. in a <1 ppm O$_2$/H$_2$O drybox in a Teflon coated, crimped topped bottle.

$\eta^5$-Methycyclopentadienyl zirconium tris(diethylamide) was prepared by a similar procedure. This, in dilute toluene solution, at −50 to −75°, was reacted with a toluene solution of pivalic acid (trimethyl acetic acid) resulting in the $\eta^5$-methylcyclopentadienyl zirconium tris (trimethylacetate). This was purified by recrystallization from aliphatic hydrocarbons at low temperatures.

All reactions and manipulations were carried out in a <1 ppm O$_2$/H$_2$O drybox or on a vacuum line. Exceptional care was taken to exclude H$_2$O, O$_2$ and polar compounds.

Catalyst Precursor Preparation: CpZrCl$_3$

CpZrCl$_3$ is commercially available from Strem Chemicals, and may also be synthesized according to Reid et al., *J. Organomet. Chem.*, Vol. 2, p.329 (1964).

Examples 1–24

A series of ethylene/1-hexene copolymers were produced in a 1.8 liter, stirred (275 rpm), slurry phase reactor using $\eta^5$-indenyl zirconium tris(diethylcarbamate)/MMAO catalyst compositions. In Example 1, the catalyst composition comprised only $\eta^5$-indenyl zirconium tris(diethylcarbamate) and MMAO. In Examples 2–24, the catalyst compositions comprised $\eta^5$-indenyl zirconium tris(diethylcarbamate), MMAO and an activity enhancing cycloalkadiene as shown in Table 1. Examples 1–24 were carried out as follows.

The reactor was baked out (110° C./N$_2$) for approx. 1 hr. After cooling, 1,000 ml of deoxygenated hexanes were added along with 100 ml of freshly distilled (over CaH$_2$) 1-hexene and 1.14 ml TIBA (in heptanes, 0.87 mmole, equal to 1 mmole). The reactor was closed, brought to temperature (85° C.), 100 ml H$_2$ was added, and the reactor was pressured to 200 psi total system pressure with ethylene. At pressure equilibrium, one micromole of catalyst composition solution containing $\eta^5$-indenyl zirconium tris (diethylcarbamate), MMAO, and optionally cycloalkadiene was injected through a high pressure septum/pressure syringe. The cycloalkadiene was added to the catalyst composition such that each catalyst precursor molecule was paired with one cycloalkadiene ring. Thus, when the cycloalkadiene had two rings, the mole ratio of cycloalkadiene to catalyst precursor was 0.5.

This initiated the reaction. Very active catalyst compositions typically resulted in temperature increases to 90–95° C., soon brought under control to level out at 85° C.±2° C. The ethylene flow rate, system pressure, and reactor temperature (internal and external) was monitored continuously. The reactions were run for 30 min., unless the catalyst composition proved to be too productive. In this case, the reactions were run for only 10–15 min. (no more than approx. 900 counts approx. 90 g polymer). Polymerization was terminated by injection of 1 ml anhydrous isopropanol (at temperature and pressure), and simultaneous cooling/venting. Thus, the polymerization reaction was initiated and terminated under the stated temperature and pressure conditions.

After discharging the reactor the polymer/hexane slurry was mixed with 0.35 g IRGANOX in 1 ml acetone (stabilizer). The entire polymer slurry was evaporated to dryness overnight under a well ventilated hood. The dried polymer was weighed and analyzed for Zr contents.

The results of Examples 1–24 are shown in Table 1.

Examples 25–29

A series of ethylene1-hexene copolymers were produced in the same manner as Examples 1–24 using an $\eta^5$-indenyl zirconium tris(diethylcarbamate)/MMAO catalyst composition containing varying amounts of cyclopentadiene. The results are shown in Table II.

Examples 30–37

A series of ethylene/1-hexene copolymers were produced in the same manner as Examples 1–24 using $\eta^5$-methylcyclopentadienyl zirconium tris (trimethylacetate)/MMAO catalyst compositions instead. In Example 30, the catalyst composition comprised only $\eta^5$-methylcyclopentadienyl zirconium tris(trimethylacetate) and MMAO. In Examples 31–37, the catalyst compositions comprised η5-methylcyclopentadienyl zirconium tris (trimethylacetate), MMAO, and an activity enhancing cycloalkadiene.

The results are shown in Table III.

Examples 38 and 39

Two ethylene/1-hexene copolymers were produced in a mechanically stirred, pilot scale, gas phase reactor. In Example 38, the catalyst composition comprised only $\eta^5$-indenyl zirconium tris(diethylcarbamate) and MMAO. In Example 39, the catalyst composition comprised $\eta^5$-indenyl zirconium tris(diethylcarbamate), MMAO, and cyclopentadiene. Examples 38 and 39 were carried out as follows.

Before both batch runs, a pre-bed was charged to the reactor, which was then pressure-purged with nitrogen three times to 100 psig. Jacket temperature was adjusted to hold the material at approximately 80° C. overnight while under a 3–4 lb./hr nitrogen flow purge at 100 psig reactor pressure. Prior to both runs, the reactor was pressure purged once to 300 psi and then 50 ml of cocatalyst solution were then charged to further passivate the reactor. The reactor was then pressure purged four more times to 100 psig. Raw materials were charged to establish the initial gas phase concentrations of ethylene, hexene, and nitrogen. Gas-phase concentrations are normally held near these initial values throughout the batch.

Catalyst composition was fed to the reactor continuously during the polymerization using isopentane as a carrier and nitrogen as a dispersant. Catalyst feed rate was adjusted as required to maintain polymerization rates of 5–7 lbs/hr.

Monomers and hydrogen were fed continuously as required to maintain gas phase composition throughout the batch. The 1-hexene/ethylene mole ratio was maintained in the range of 0.034 to 0.036. A small vent stream was used to prevent accumulation of the nitrogen added with the catalyst. The batch was terminated when the bed weight approached 25–30 lbs. by shutting off the feeds and rapidly venting the reactor to atmospheric pressure. The reactor was then pressure purged five times to 100 psi with dry nitrogen. The resin was then discharged into a product box and exposed to the atmosphere. Once in the box, a two-nozzle purging manifold was inserted deep into the resin in order to purge it out with water-saturated nitrogen overnight at ambient temperature.

The results are shown in Table IV.

Examples 40–48

A series of ethylene/1-hexene copolymers were produced in a 1.0 liter, stirred (190 rpm), slurry phase reactor using cyclopentadienyl zirconium trichloride/MAO catalyst compositions. In Example 48, the catalyst composition comprised only cyclopentadienyl zirconium trichloride and MAO. In Examples 40–47, the catalyst compositions comprised cyclopentadienyl zirconium trichloride, MAO and an activity enhancing cycloalkadiene as shown in Table V. Examples 40–48 were carried out as follows.

The reactor was baked out (110° C./$N_2$) for approx. 1 hr. After cooling, 500 ml of deoxygenated hexanes were added along with 0 to 40 ml of freshly distilled (over $CaH_2$) 1-hexene and 0.5 to 1.0 ml TIBA (in heptanes, 0.87 mmole). The reactor was closed, brought to temperature (85° C.), and the reactor was pressured to 150 psi total system pressure with ethylene. At pressure equilibrium, a suitable amount of catalyst composition solution (formed by combining cyclopentadienyl zirconium trichloride, MAO cocatalyst in toluene solution, and an activity enhancing cycloalkadienyl, aged for a measured period of time) was introduced into the reactor in the amount shown in Table V.

The reactions were run for 30 minutes, except in the case of Example 40, which was run for 15 minutes. Polymerization was terminated by injection of 1 ml anhydrous isopropanol (at temperature and pressure), and simultaneous cooling/venting. After discharging the reactor the polymer/hexane slurry was evaporated to dryness overnight under a well ventilated hood.

The results of Examples 40–48 are shown in Table V.

Examples 49–54

A series of 0.920 density ethylene/1-hexene copolymers were produced in pilot scale, fluidized bed, gas phase reactor. In Examples 49 and 50, the catalyst composition comprised only $\eta^5$-methylcyclopentadienyl zirconium tris (trimethylacetate) and MMAO. In Examples 51–54, the catalyst compositions comprised $\eta^5$-methylcyclopentadienyl zirconium tris(trimethylacetate) and methyl n-propyl cyclopentadiene in a 1:1 mole ratio and MMAO.

Catalyst composition was fed to the reactor continuously during the polymerization using an isopentane/1-hexene mix as a carrier and nitrogen as a dispersant. Monomers and hydrogen were fed continuously as required to maintain gas phase composition. The 1-hexene/ethylene mole ratio was maintained in the range of 0.027 to 0.032. In Example 53, polymerization was conducted in condensing mode, with 6 weight percent condensed isopentane in the polymerization zone. In Example 54, polymerization was conducted in condensing mode, with 7 weight percent condensed isopentane in the polymerization zone.

The results are shown in Table VI.

TABLE I

| Example | Cycloalkadiene | Activity | MI | FI | MFR | BBF |
|---|---|---|---|---|---|---|
| 1 | None | 22,700 | 13.9 | | | 5.8 |
| 2 | (indene structure) | 79,900 | 6.4 | — | — | 8.4 |
| 3 | (methylindene structure) | 98,800 | 8.7 | — | — | 15.2 |

TABLE I-continued

| Example | Cycloalkadiene | Activity | MI | FI | MFR | BBF |
|---|---|---|---|---|---|---|
| 4 | 2-(4-trifluoromethylphenyl)indene | 82,600 | 6.52 | — | — | 11.7 |
| 5 | 2-(4-fluorophenyl)indene | 60,000 | 3.35 | 97.9 | 29.2 | 11.7 |
| 6 | 2-(4-methoxyphenyl)indene | 39,500 | 20.8 | — | — | 7.0 |
| 7 | 2-(4-methylphenyl)indene | 90,800 | 8.1 | — | — | 9.3 |
| 8 | 1-phenylindene | 82,700 | 1.6 | 32.7 | 24.2 | 7.4 |
| 9 | 1-(3,5-bis(trifluoromethyl)phenyl)indene | 70,000 | 2.1 | 51.0 | 24.3 | 8.3 |
| 10 | bis(indenyl) | 91,200 | 12.5 | — | — | 11.7 |
| 11 | 2-butylindene | 50,600 | 1.19 | — | — | 7.3 |
| 12 | 2-(3-butenyl)indene | 45,400 | 0.81 | 39.8 | 32.2 | 6.9 |

TABLE I-continued

| Example | Cycloalkadiene | Activity | MI | FI | MFR | BBF |
|---|---|---|---|---|---|---|
| 13 | (indene-CH)₂ | 76,100 | 4.9 | — | — | 11.8 |
| 14 | (indene-Si(CH₃)₂)₂ | 36,400 | 1.53 | — | — | 8.4 |
| 15 | fluorene | 32,500 | 0.89 | 32.4 | 28.8 | 8.2 |
| 16 | (fluorenyl-Si(CH₃)₂)₂ | 17,800 | 15.0 | — | — | 6.0 |
| 17 | fluorenyl-C(φ₂)-cyclopentadienyl | 14,200 | 5.8 | — | — | 6.0 |
| 18 | fluorenyl-C(CH₃)₂-cyclopentadienyl | 9,850 | 0.81 | 53.1 | 43.0 | 7.8 |
| 19 | cyclopentadiene | 60,800 | 0.77 | 30.5 | 23.5 | 7.9 |
| 20 | methylcyclopentadiene | 91,200 | 1.17 | 25.6 | 22.0 | 9.2 |
| 21 | trimethylsilylcyclopentadiene | 65,900 | 6.1 | — | — | 10.8 |

TABLE I-continued

| Example | Cycloalkadiene | Activity | MI | FI | MFR | BBF |
|---|---|---|---|---|---|---|
| 22 | (pentamethylcyclopentadiene) | 60,700 | 0.51 | 50.6 | 25.8 | 4.2 |
| 23 | (ethyltetramethylcyclopentadiene) | 50,800 | 0.97 | 30.3 | 29.4 | 4.9 |
| 24 | (6,6-dimethylfulvene) | 23,000 | 2.1 | — | — | 8.0 |

TABLE II

| Example | $C_5H_6$/Catalyst Precursor Mole Ratio | FI[a] | Activity | BBF |
|---|---|---|---|---|
| 25 | 0 | 0.93 | 6,960 | 8.3 |
| 26 | 0.1 | 0.84 | 15,700 | 7.8 |
| 27 | 0.3 | 0.87 | 19,800 | 8.4 |
| 28 | 0.5 | 0.84 | 24,500 | 8.5 |
| 29 | 1.0 | 0.86 | 37,800 | 9.7 |

[a]MI <0.2.

TABLE III

| Example | Cycloalkadiene | Cycloalkadiene/Catalyst Precursor Mole Ratio | Activity | FI | BBF |
|---|---|---|---|---|---|
| 30 | None | — | 21,200 | 0.51 | 7.0 |
| 31 | (bis-indenyl)₂ | 1:1 | 50,600 | 1.58 | 7.5 |
| 32 | (bis-indenyl)₂ | 0.2:1 | 37,900 | 1.06 | 7.7 |
| 33 | (methylpropylcyclopentadiene) | 1:1 | 47,900 | 0.92 | 8.8 |

TABLE III-continued

| Example | Cycloalkadiene | Cycloalkadiene/ Catalyst Precursor Mole Ratio | Activity | FI | BBF |
|---|---|---|---|---|---|
| 34 | (Mixture of 3 isomers) | 1:1 | 53,500 | 2.08 | 9.6 |
| 35 | (Isomer mixture) | 1:1 | 43,200 | 1.28 | 9.6 |
| 36 | (Isomer mixture) | 1:1 | 33,900 | 1.31 | 8.2 |
| 37 |  | 1:1 | 41,500 | 0.66 | 9.3 |

TABLE IV

|  | Example | |
|---|---|---|
|  | 38 | 39 |
| Cycloalkadiene/Catalyst Precursor Mole Ratio | 0 | 2.5 |
| MI | 20.7 | 4.07 |
| FI | 570 | 96.1 |
| MFR | 27.5 | 23.6 |
| Zr (ppm) | 4.9 | 2.1 |
| BBF | 19.1 | 17.9 |

TABLE V

| Example | Cycloalkadiene | Cycloalkadiene/Zr Mole Ratio | Activity | MI | FI | MFR | BBF |
|---|---|---|---|---|---|---|---|
| 40 | (indene) | 3.3 | 97000 | 0.60 | 13.1 | 22.0 | — |
| 41 | " | 3.3 | 49500 | 0.44 | 10.3 | 23.0 | — |
| 42 | (fluorene) | 1.6 | 16000 | 0.27 | 5.36 | 19.7 | — |
| 43 | (Me$_2$Si bridged indenyl-CH$_3$) | 3.6 | 38500 | NF | 5.65 | — | 6.8 |
| 44 | " | 3.6 | 53900 | 1.72 | 50.1 | 29.0 | 17.4 |
| 45 | (azulene) | 1.0 | 18300 | 0.46 | 14.4 | 31.0 | — |
| 46 | " | 1.0 | 50200 | — | — | — | — |
| 47 | (H$_3$C, H$_3$C, $^i$Pr substituted azulene) | 1.0 | 13200 | — | — | — | — |
| 48 | None | — | 4200 | — | — | — | — |

TABLE VI

| Example | C$_6$=/C$_2$= | Al/Zr$^a$ | H$_2$, ppm | MI | MFR | Density | Activity |
|---|---|---|---|---|---|---|---|
| 49 | 0.03 | 450 | 250 | 0.73 | 25 | 0.9211 | 4500 |
| 50 | 0.032 | 350$^b$ | 270 | 0.80 | 28 | 0.9190 | 3600 |
| 51 | 0.028 | 600 | 210 | 0.9 | 17 | 0.9170 | 56,000 |
| 52 | 0.027 | 650 | 245 | 1.2 | 17 | 0.9195 | 62,900 |
| 53 | 0.027 | 600$^c$ | 210 | 1.2 | 18 | 0.9194 | 30,000 |
| 54 | 0.029 | 600 | 210 | 1.0 | 18 | 0.9180 | 43,400 |

$^a$Nominal
$^b$3.8 ppm Zr, Al/Zr-381
$^c$0.97 ppm Zr; Al/Zr-260

We claim:

1. A process for the polymerization of an olefin, which comprises contacting at least one olefin monomer under polymerization conditions with a catalyst composition comprising the reaction product of:

a) monocycloalkadienyl catalyst precursor having the formula:

$$LMX_x$$

wherein:

M is a metal selected from the group consisting of Ti, Zr and Hf:

L is a cycloalkadienyl ligand selected from the group consisting of cyclopentadienyl, indenyl and fluorenyl optionally substituted with one or more hydrocarbyl groups containing 1 to 20 carbon atoms;

each X is independently hydrogen, an aryl, alkyl, alkenyl, alkylaryl, or arylalkyl radical having 1–20 carbon atoms, a hydrocarboxy radical having 1–20 carbon atoms, a halide, a nitrogen containing radical having 1–20 carbon atoms, or Q$_2$YZ, wherein each Q is independently selected from the group consisting of —O—, —NR—, —CR$_2$— and —S—; Y is either C or S; and Z is selected from the group consisting of —OR—, —NR$_2$, —CR$_3$, —SR, —SiR$_3$, —PR$_2$, —H, and aryl groups, with the proviso that when Q is —NR— then Z is selected from the group consisting of —OR, —NR$_2$, —SR, —SiR$_3$, —PR$_2$ and —H; and x is 2, 3, or 4 depending upon the valence state of M;

b) an activity enhancing cycloalkadiene; and c) an activating cocatalyst.

2. The process of claim 1, wherein the monocycloalkadienyl catalyst precursor has a formula selected from the group consisting of:

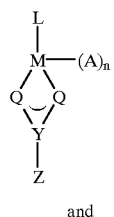

and

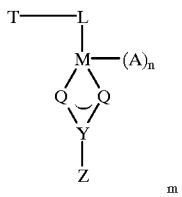

wherein:
M is a metal selected from the group consisting of Ti, Zr and Hf;
L is a cycloalkadienyl ligand selected from the group consisting of cyclopentadienyl, indenyl and fluorenyl optionally substituted with one or more hydrocarbyl groups containing 1 to 20 carbon atoms;
each Q is independently selected from the group consisting of —O—, —NR—, —CR$_2$— and —S—;
Y is C or S;
Z is selected from the group consisting of —OR—, —NR$_2$, —CR$_3$, —SR, —SiR$_3$, —PR$_2$, —H and aryl groups, with the proviso that when Q is —NR— then Z is selected from the group consisting of —OR—, NR$_2$, —SR, —SiR$_3$, —PR$_2$ and —H;
n is 1 or 2;
A is a univalent anionic group when n is 2 or A is a divalent anionic group when n is 1;
each R is independently a group containing carbon, silicon, nitrogen, oxygen, and/or phosphorus where one or more R groups may be attached to the L substituent;
T is a bridging group selected from the group consisting of alkylene and arylene groups containing from 1 to 10 carbon atoms, germanium, silicone and alkyl phosphine; and
m is 2 to 7.

3. The process of claim 2, wherein the monocycloalkadienyl catalyst precursor is selected from the group consisting of indenyl zirconium tris(diethylcarbamate), indenyl zirconium tris(trimethylacetate), and (methylcyclopentadienyl) zirconium tris(trimethylacetate).

4. The process of claim 1, wherein the activity enhancing cycloalkadiene is selected from the group consisting of cyclopentadiene, methylcyclopentadiene, indene, and methyl-n-propylcyclopentadiene.

5. The process of claim 1, wherein the activity enhancing cycloalkadiene is present in an amount of about 0.01 to about 10 moles per mole of catalyst precursor.

6. The process of claim 1, wherein the activating cocatalyst is selected from the group consisting of methylaluminoxane and modified methylaluminoxane.

7. The process of claim 1 conducted in the gas phase.

8. The process of claim 1, wherein the catalyst composition is in liquid form.

* * * * *